J. A. EVARTS.
Assignor to the Bradley & Hubbard Manufacturing Co.
EXTENSION LAMP FIXTURES.
No. 7,628.
Reissued April 24, 1877.
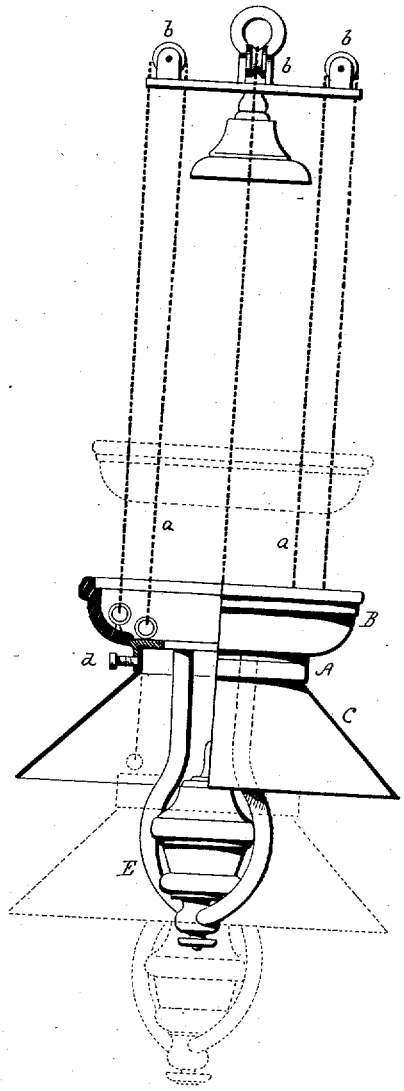
Witnesses.
J. H. Thomas
Clara Broughton.
John A. Evarts.
Inventor.
By Atty.
John E. Earle.
N. PETERS, PHOTO-LITHOGRAPHER, WASHINGTON, D. C.

UNITED STATES PATENT OFFICE

JOHN A. EVARTS, OF WEST MERIDEN, CONNECTICUT, ASSIGNOR TO THE BRADLEY & HUBBARD MANUFACTURING COMPANY.

IMPROVEMENT IN EXTENSION-LAMP FIXTURES.

Specification forming part of Letters Patent No. 183,913, dated October 31, 1876; reissue No. 7,628, dated April 24, 1877; application filed April 12, 1877.

*To all whom it may concern:*

Be it known that I, JOHN A. EVARTS, of West Meriden, in the county of New Haven and State of Connecticut, have invented a new Improvement in Extension-Lamp Fixtures; and I do hereby declare the following, when taken in connection with the accompanying drawings and the letters of reference marked thereon, to be a full, clear, and exact description of the same, and which said drawings constitute part of this specification, and represent a sectional side view.

This invention relates to an improvement in what are called "extension-lamp fixtures"—that is to say, a fixture which, when suspended, will allow the lamp to be drawn down, or rest at different elevations, and especially to that class in which a removable shade, of glass or porcelain, is employed. Such shades cannot be made a permanent part of the fixture, and the fixture must therefore be constructed with devices for securing the shade and yet allow of its removal, as for cleaning or other purposes.

In the usual construction, the shade serves as the counter-balance, and rises while the lamp is drawn down; hence, the shade can serve its full purpose only in one predetermined position.

The object of this invention is to so construct the fixture that the lamp and shade together will be drawn down; and it consists in combining in an extension-lamp fixture a shade-ring provided with a device for removably securing the shade to the ring, with the lamp attached to said shade-ring, and a weight, of ring form, to serve as a counterbalance, the said ring-shaped weight and shade-ring connected by chains or cords over a suitable support above, so that the lamp and shade may be drawn down, the weight-ring rising from the shade-ring, all as more fully hereinafter described.

A is the shade-ring, from which chains or cords *a* extend up over pulleys *b*, thence down, and the other end of the chains attached to a weight, B, in shape a ring, the opening in which corresponds substantially to the opening in the shade-ring, and so that, by drawing down this shade-ring, the weight will rise, as indicated in broken lines; but when the shade-ring is at its highest elevation, then the weight-ring may rest thereon.

As the weight rises, it will owing to its ring or open shape, pass over the smoke-bell F, and is not, therefore, limited by the smoke-bell in such rising.

The shade C is of the usual form for such shades, and generally made from glass, porcelain, or similar material, a flange on its upper edge entering the ring A, and so as to rest therein, and secured by a set-screw, *d*, or other suitable device, which will hold the shade in place, and yet allow of its being removed or replaced as occasion may require. E, the lamp-holder, is attached to the shade-ring, and so as to move up and down with the shade-ring and shade, as indicated in broken lines. To this holder the lamp is secured in the usual manner.

The ring-weight B is made of sufficient weight to counterbalance the shade, its ring, and lamp, and so that the lamp may rest at any position between its two extremes.

I claim—

1. The combination, in an extension-lamp fixture, of the shade-ring, a device for removably securing the shade to the ring, the lamp attached to said shade-ring, the ring-shaped weight and shade-ring, connected by chains or cords over a support above, substantially as described.

2. The combination in an extension-lamp fixture, of the shade-ring, a device for removably securing the shade to the ring, a shade constructed at its upper edge for attachment to said shade-ring, and engagement with said securing device, the lamp attached to said shade-ring, the ring-shaped weight and shade-ring, connected by chains or cords over a support above, substantially as described.

JOHN A. EVARTS.

Witnesses:

ORVILLE H. PLATT,
ANNIE B. PLATT.